(12) United States Patent
Lowney et al.

(10) Patent No.: US 10,467,112 B2
(45) Date of Patent: Nov. 5, 2019

(54) DISTRIBUTED DATA MONITORING DEVICE

(71) Applicant: Bank of America Corporation, Charlotte, NC (US)

(72) Inventors: Todd Lowney, Jacksonville, FL (US); Velmurugan Vinayakam, Concord, CA (US); Frederick L. Anderson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 168 days.

(21) Appl. No.: 15/807,935

(22) Filed: Nov. 9, 2017

(65) Prior Publication Data

US 2019/0138410 A1    May 9, 2019

(51) Int. Cl.
*G06F 11/20* (2006.01)
*G06F 11/30* (2006.01)

(52) U.S. Cl.
CPC ...... *G06F 11/2033* (2013.01); *G06F 11/3006* (2013.01)

(58) Field of Classification Search
CPC .................. G06F 11/2033; G06F 11/3006
USPC ................................................ 714/4.1, 4.11
See application file for complete search history.

(56) References Cited

U.S. PATENT DOCUMENTS

| | | | |
|---|---|---|---|
| 8,874,600 B2 | 10/2014 | Gupta et al. | |
| 9,081,826 B2 | 7/2015 | Murthy et al. | |
| 9,147,373 B2 | 9/2015 | Cunningham et al. | |
| 9,172,608 B2 | 10/2015 | Zeyliger et al. | |
| 9,342,557 B2 | 5/2016 | Kornacker et al. | |
| 9,361,344 B2 | 6/2016 | Murthy et al. | |
| 9,396,459 B2 * | 7/2016 | Gabay | G06Q 10/087 |
| 9,727,355 B2 | 8/2017 | Holler et al. | |
| 2005/0081119 A1 * | 4/2005 | DiZoglio | G06F 11/0727 |
| | | | 714/47.1 |
| 2014/0330785 A1 * | 11/2014 | Isherwood | G06F 11/1446 |
| | | | 707/640 |
| 2018/0157521 A1 * | 6/2018 | Arikatla | G06F 9/45558 |

OTHER PUBLICATIONS

"Open Database Connectivity," https://wikipedia.org/wiki/Open_Database_Connectivity#ODBC-to-JDBC_.28ODBC-JDBC.29_bridges, Wikimedia Foundation, Inc., Nov. 3, 2017.

* cited by examiner

*Primary Examiner* — Joseph R Kudirka
(74) *Attorney, Agent, or Firm* — Weiss & Arons LLP; Michael A. Springs, Esq.

(57) ABSTRACT

Method and apparatus for a system to detect, address, and resolve defects, disfunctions, and inefficiencies in a distributed data environment. One or more diagnostics monitor specific operating parameters of specific services operating within the distributed data environment. When the diagnostic detects a service operating outside of a pre-determined threshold, an alert message is issued. Appropriate responses to the alert message assures that the system will maintain high availability protocol and will operate efficiently.

20 Claims, 8 Drawing Sheets

DISTRIBUTED DATA MONITORING DEVICE

FIELD OF TECHNOLOGY

This disclosure relates to enhancing the performance of a computer system. Specifically, the disclosure relates to enhancing the performance of distributed data environment for processing large data sets with a parallel, distributed algorithm, on a cluster architecture.

BACKGROUND OF THE DISCLOSURE

Data processing comprises activities such as data entry, data storage, data analysis (such as searching, aggregating, sorting, and otherwise manipulating the data), and data display (such as media outputs, printouts, screen displays, tables, charts, and graphs). With small data sets these activities can be performed in a relatively straightforward manner on a single device with a memory capacity capable of handling the data set. However, with a large data set, for example one whose size exceeds the memory capacity of any one device (for example all the websites of the world wide web), components of the data set must be broken up between multiple independently operating devices. Coordinating the performance of these independently operating devices for data processing involves additional complexities and complications. A distributed data environment is an architecture for data processing which attempts to address these complexities and complications.

The complexities and complications inherent to a distributed data environment are myriad. For example, a system must be in place for cataloging and locating each of the data sets but this system must itself be complex enough to address differences in where the components are stored and how they can be accessed. Moreover, because the numerous independent devices are collectively dynamic, meaning they are often failing, being moved, taken offline, being replaced, being upgraded, etc., the system for cataloging and locating needs to have a built-in flexibility to react to this dynamism. Also, because the data is so vast, standard data processing techniques relying on moving targeted data sets back and forth between applications are not feasible. This is because they would cause data traffic obstructions and would make maintaining consistencies in the data set among concurrent data processing of the data set impossible.

Many prior art attempts have been made to address these complexities. A widespread problem innate to these attempts is that they do not provide specifically crucial information at a specifically appropriate time or specifically appropriate manner to practically address such complexities. This is because diagnostic processes for a distributed data environment are themselves vulnerable to the same inherent complexities as the distributed data environment itself. As a result, because system failures and errors can occur rapidly but diagnoses of system failures and errors can only occur more slowly, there is clear utility in and benefit from, novel methods and apparatuses for accurately and efficiently implementing diagnoses of and improvements in the performance of a distributed data environment.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

For the purposes of this disclosure, like reference numerals in the figures shall refer to like features unless otherwise indicated. The drawings are only an exemplification of the principles of the invention and are not intended to limit the disclosure to the particular embodiments illustrated.

BRIEF SUMMARY

Figure 1:
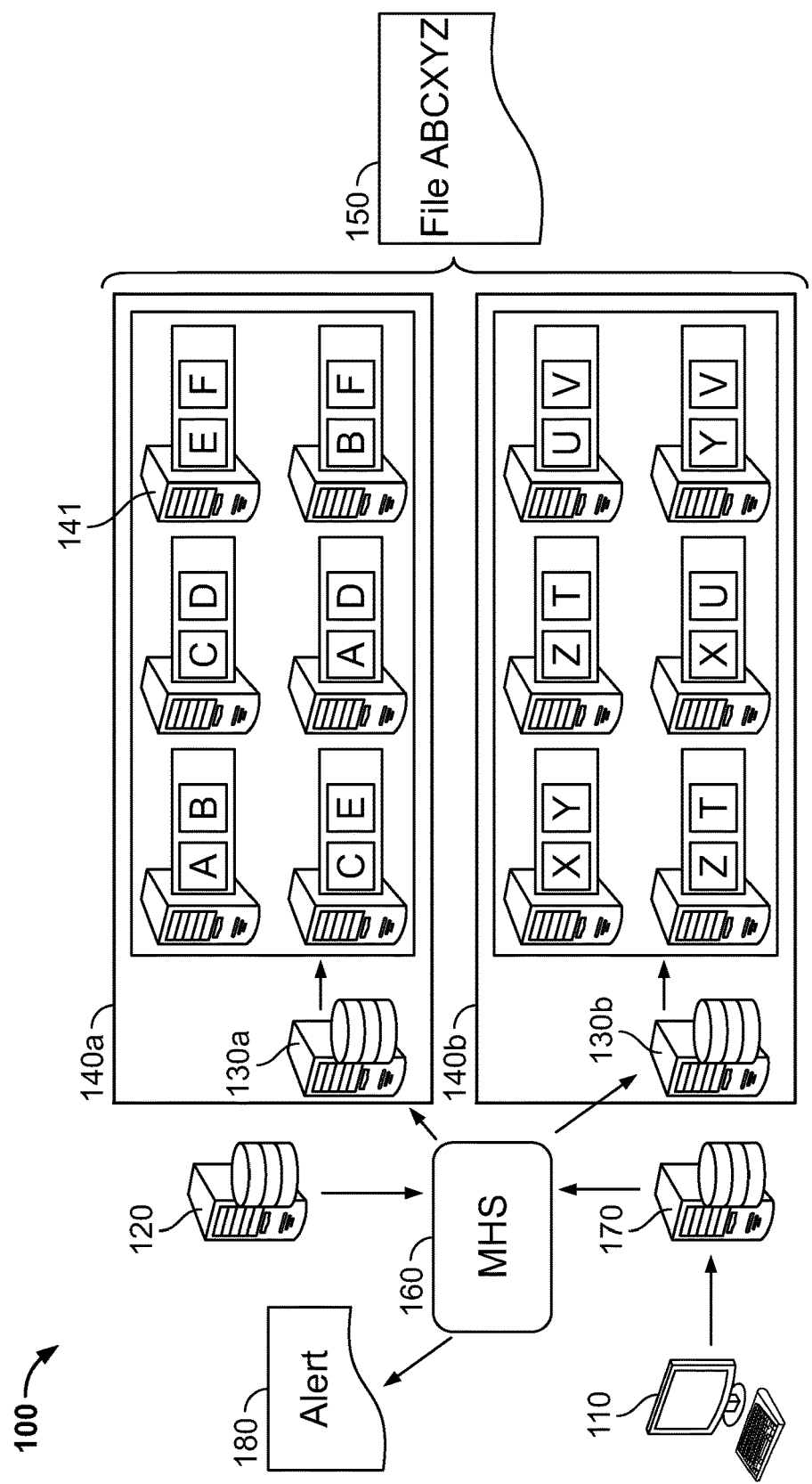
FIG. 1 is a first drawing illustrating a monitoring device for a distributed data environment.

To satisfy the long-felt but unsolved needs identified above, at least one embodiment is directed toward an apparatus or system for executing a computing application within a distributed data environment. The system may comprise a plurality of functional units including clusters, a plurality of clients, and a master node. The master node may be a non-transitory computer readable medium configured to perform diagnostics of the system. The diagnostics may comprise monitoring and measuring communications between clients and clusters and aggregating and analyzing at least a portion of that which is monitored by at least one name-node.

The system may be configured to generate an alert message when a diagnostic reveals a measured value exceeds a pre-determined threshold value. Each cluster may comprise a dataset, a name-node, a standby name-node and a plurality of data-nodes. The dataset may be information distributed among a plurality of blocs. Each bloc may comprise memory residing on at least one data-node. Each data-node may be a non-transitory computer readable medium. Each name-node may be associated with a unique identifier.

Each name-node may comprise a processor. Each processor may be configured to receive and reply to requests for reading and/or writing access to the dataset. Each processor may also be configured to monitor its own operability and the operability of each data-node. Each processor may also be configured to monitor the used capacity and the overall capacity of the plurality of blocs. Each processor may also be configured to instruct the data-node to create, delete, or replicate blocs. In some embodiments, the instruction may be based on or in response to a current ratio between the used capacity and the overall capacity.

Each client may be a non-transitory computer readable medium configured to communicate with the name-node. Each client may make requests for reading access and optionally writing access to the dataset. Each standby name-node may be configured, when in an active state, to operate substantially identically to the name-node.

The master node may be further configured, in response to receiving the alert message and validating the alert message, to place the name-node into de-active state and place the standby name-node into active state.

Each alert message may comprise a service component, a role component, a health component, and a threshold component.

The master node may have a processor running a workflow scheduling software application. The diagnostic may comprise communications with the name-node via an application programming interface utilizing a representational state transfer between the workflow scheduling software application and the name-node.

The alert message may comprise a health component. The health component may indicate whether the probability that the severity of failure of the name-node is in excess of a pre-determined threshold value. The health component may also indicate when the probability of the standby name-node failing before a second standby name-node is installed at the cluster is below a pre-determined threshold value.

The system may further comprise at least three journal-nodes, each journal-node may be a non-transitory computer readable medium communicating with the master node, a name-node of a cluster, and the standby name-node of the cluster. The journal-node may indicate to the master node if the standby name-node has been activated. The alert message may indicate when at least two journal-nodes are not functioning.

The name-node may comprise an application. The application may allocate blocs between the data-nodes according to a pre-determined arrangement. The alert message may indicate that the actual allocation of blocs between the data-nodes does not correspond to the pre-determined arrangement.

At least one cluster may comprise a layered architecture. The layered architecture may be characterized as the name-node interacting with at least one data-node by relaying communications from or to the data-node from or to a non-transitory computer readable medium associated with a domain address. The domain address instructs the navigation of an executing program to find the data-node from another location over a communication medium. Communications transiting from the name-node to the data-node are directed per the domain address. The address-associated non-transitory computer readable medium may bear another domain address associated with another non-transitory computer readable medium which communications are relayed from or to, or it may bear the bloc. The diagnostic performed by the master node on the system, may determine if in fact, all the domain addresses do or do not span entirely from the name-node to the bloc. An alert message including data related to an incomplete span may be generated based on the diagnostic.

The system may comprise a first cluster and a second cluster. The system may also include a first database query system. The first database query system may be compatible with the name-node or data-node of the first cluster but not compatible with the name-node or data-node of the second cluster, and a second database query system compatible with the name-node or data-node of the second cluster but not compatible with the name-node or data-node of the first cluster. The system may also include also include a master node. The master node may contain an application. The application may be configured to receive a query. The application may also be configured to respond with a final query result. The master node may apply the first database query system to the first cluster. The master node may also apply the second database query system to the second cluster. The master node may also aggregate results from both the first database query system and the second database query system to generate a final query result. The diagnostic performed by the master node on the system may determine if a query applied to a name-node was completed before the name-node was placed in a de-active state. In the event that the query applied to a name-node was not completed before the name-node was placed in a de-active state, an alert message indicating that the final query result may be incorrect may be generated based on the diagnostic.

The system may further comprise a balancer. The balancer may be used the executable load placed on the components within the system. The balancer may be used to ensure that each component receives an approximately equal amount of executable actions. The diagnostic performed by the master node on the system may further measure the time taken to complete two concurrent read-write actions within the same cluster. An alert message indicating that the balancer may be out of order may be generated if the diagnostic determines that the time taken to complete at least one of the concurrent actions exceeds a pre-determined threshold.

The name-nodes and data nodes may conform to high availability protocols.

The alert message may include a role component. The role component may be a service role. The service role may include batch data processing, database query/Structured Query Language, data streaming into or out of the environment, data searching, software development kits/(SDK), resource management, environment security, environment file systems, relational operability, structured system integrations and unstructured systems integrations. A portion of the clusters may comprise structured data sets and a portion of the clusters may include unstructured data sets. In some embodiments, a portion of the blocs may reside within clusters that are only accessible via communication over an unsecure medium. In these embodiments session keys may be used for encrypting and decrypting communications over the unsecure medium. The diagnostic performed by the master node on the system may detect errors in the creation or retrieval of the session keys.

The system may further comprise a data stream service. The data stream service may include bundling sources. The sources may include operational hardware or software. The operational hardware or software may be configured to receive data items from blocs having similar properties or destinations. The data stream service may include unbundling sinks. These sinks may include operational hardware or software. The operational hardware or software included in the sinks may be configured to receive data items from bundling sources and to appropriately direct the retrieved data to a user requesting the data. The system may include one or more channels. The channels may be used to transfer data downstream from one or more bundling sources to one or more unbundling sinks. The diagnostic performed by the master node in the system may determine if the status or operation of one or more of the bundling source, unbundling sink, or channel deviates from a pre-determined threshold. One or more channels may further comprise a plurality of hop-paths and/or branch-paths. Each hop-path may define only a portion of the path that data traveling from the bundling source to the unbundling sink must traverse. Each branch path may define a junction where data traversing the channel may be directed to one of two or more further downstream hop paths. The diagnostic performed by the master node on the system may evaluate how many possible paths are operational between the bundling source and the unbundling sink and/or the speed or capacity associated therewith. In some exemplary embodiments, there may be between 100-300 channels and an alert message may be generated when the number of channels drops to below 150 channels.

At least one embodiment may be directed toward a method for executing a computing application within a distributed data environment. The method may include providing a system. The system may include a plurality of clusters, a plurality of clients, and a master node. The master node may be configured to perform diagnostics on the the system. The diagnostics may include monitoring and measuring communications between clients and clusters. The diagnostics may also include aggregating and analyzing at least a portion of that which is monitored by at least one name-node. The system may also be configured to generate an alert message when a diagnostic reveals that a measured value exceeds a pre-determined threshold value. Each cluster may comprise a dataset, a name-node, a standby name-node and a plurality of data-nodes. The dataset may be information distributed among a plurality of blocs. Each bloc may include memory residing on at least one data-node. Each data-node may be a non-transitory computer readable medium. Each name-node may be associated with a unique identifier. Each name-node may include a processor. Each processor may be configured to receive and reply to requests for reading access and writing access to the dataset. Each processor may also monitor its own operability and the operability of each data-node. Each processor may also monitor the used capacity and overall capacity of the plurality of blocs. Each processor may also instruct the data-node to create, delete, or replicate blocs in response to a determined ratio between used capacity and overall capacity. Each client may be a non-transitory computer readable medium configured to communicate with the name-node. Each client may request reading access and optionally writing access from the dataset. Each standby name-node may be configured, when in an active state, to operate substantially identically to the name-node. The master node may be further configured, in response to receiving the alert message and validating the alert message, to place the name-node into de-active state and place the standby name-node into active state.

The method may further comprise operating on the system services for batch data processing, database query/SQL, data streaming into or out of the environment, data searching, SDKs, resource management, environment security, environment file systems, relational operability, structured system integrations and unstructured systems integrations, and any combination thereof. The diagnostic may determine if all of the system services are operating according to pre-defined parameters.

The method may further comprise evaluating the health of daemons operating with the system. The evaluating may be performed by the diagnostic. The evaluation may include comparing meta-data values contained in two or more archives that all operating daemons write to chronicling their operations with each other, or with a template that they should correspond to. The alert message may indicate the presence of a conflict between the archives.

The method may also include receiving at least two data processing operation requests. The data processing operation requests may be received from at least two clients. The method may also include executing the requested data processing operations. The method may also include replying to the client with the result of the data processing request. Each data processing request may have a specific targeted data set. Each targeted data set may be distributed among more than one cluster. The data processing operation may be executed by running software within the data-nodes or name-nodes of every cluster that includes targeted data set.

DETAILED DESCRIPTION OF THE DISCLOSURE

Definitions

"Device" means any non-transitory logic using medium or electronic configured for data processing or to transmit user input and process, store, transmit, and/or output data, and includes but is not limited to, personal computers, business computers, laptop computers, tablet devices, computer networks, software applications, web browsers, Short message service devices, SMS software, email devices, email software, electronic data devices, cell phones, cell phone applications, firmware, websites, cloud-based processing, internet routers, web servers, computer terminals, personal data assistance, any component thereof, any device integrated with any of the aforementioned, and any combination thereof.

"Real-time" means a process in which data is received, processed, and a response is issued within a discrete deadline time constraint, the deadline may range from between 0.0001 microseconds and 10 seconds.

"Service" means a specific application configured to perform a specific role within the distributed data environment it may comprise one or more pieces of hardware, one or more pieces of software, and any combination thereof.

"Client" means a specific software or hardware device operating within the distributed data environment.

"User" means a specific application and/or a human interacting with the distributed data environment.

"Superuser" means a special user account used for administration of the distributed data environment, it can perform activities and access data sets forbidden to other users, per the principle of least privilege recommends that most users, clients, and applications run under an ordinary account to perform their work, and only the superuser account is capable of making unrestricted, potentially adverse, system-wide changes.

"Key" means a data set, whose presence, when a cryptographic algorithm is operating on a targeted data set, determines the specific functional output of the algorithm. Such output includes the encryption of a plain-version of the target data set into a cipher-version of the target data set as well as the de-encryption of a cipher-version of the target data set into a plain-version of the target data set.

"Configuration" means a record of the arrangement of some or all of the functional units of the distributed data environment according to their nature, number, and chief characteristics, the functional units include the specific types of hardware, software, firmware, and documentation as well as selected settings of variable operating parameters.

Embodiments

As illustrated in FIG. 1, in an embodiment, there is an improved distributed data environment 100 comprising diagnostics for improving data processing and preempting cluster failures or other disfunctions is provided. In an embodiment, the system includes hardware and/or software configured to perform a diagnostic which detects a disfunction, deviation from a defined setting, and or a property that exceeds a pre-defined threshold. In an embodiment, in response to the results of the diagnostic, an alert message is issued to a party tasked with addressing the response. In an embodiment, in reply to the alert message, the party enacts a remedy. The remedy may include but is not limited to deactivating hardware and/or software or components thereof, activating supplemental hardware and/or software to replace deactivated hardware and/or software, and changing configurations settings of one or more services to accurately depict the result of the deactivation and supplemental activation.

Distributed data environment 100 may include a master node 120, a plurality of clusters (which may comprise at least first cluster 140a and second cluster 140b), and at least one Client 110. Each Client 110 may be a device or portion thereof configured to access a data set 150 or portion thereof. The Client 110 may access data set 150 via interaction with master node 120. Master node 120 may manage software and hardware operating as a nexus thereby tying together all the distributed data and all the services used to process the distributed data.

An application may operate in an accessible manner with master node 120. The application may include a catalog. The catalog may keep track of where the specific data requested by the client is located. The data may be located within the plurality of clusters (which may comprise at least first cluster 140a and second cluster 140b). Cluster 140a, 140b may include one or more devices 141. A data set may be stored within the memory portions of devices 141. The catalog may include a plurality of names. The plurality of names may be associated with both identifiers provided by the client regarding the specific data to be accessed. The catalog may index the names with specific name-nodes 130a, 130b and data locations. Each of the name-nodes 130a, 130b may be itself device. Attempts to access the data set may be directed to nodes 130a, 130b. Various services accessible to master node 120 may perform the client's request. Various services may maintain portions of the environment that includes the request initiation.

Master node 120 may include one or more servers or devices. Master node may include manager host service 160. Manager host service 160 may monitor resource (such as memory) use on the one or more master node servers. Manager host service may allocate jobs to and from the servers to beneficially balance capacity and efficiency. One or more services of distributed data environment 100 may operate in memory. The memory may be directly managed by manager host service 160 or on other devices or nodes that interact with the manager host service.

The use of name conventions allows for the implementation of implicit (as opposed to explicit) addressing of the data. With an explicit address, such as an IP address, a specific item of data is associated with a specific data location. In contrast, with an implicit system, the address merely indicates where the process for accessing the data starts. By using an implicit address, if the data is migrated or backed up within another device at another location, the access process can be easily adjusted by changing the address associated with an out-of-date name-node to the address of a now current name-node.

Figure 2:
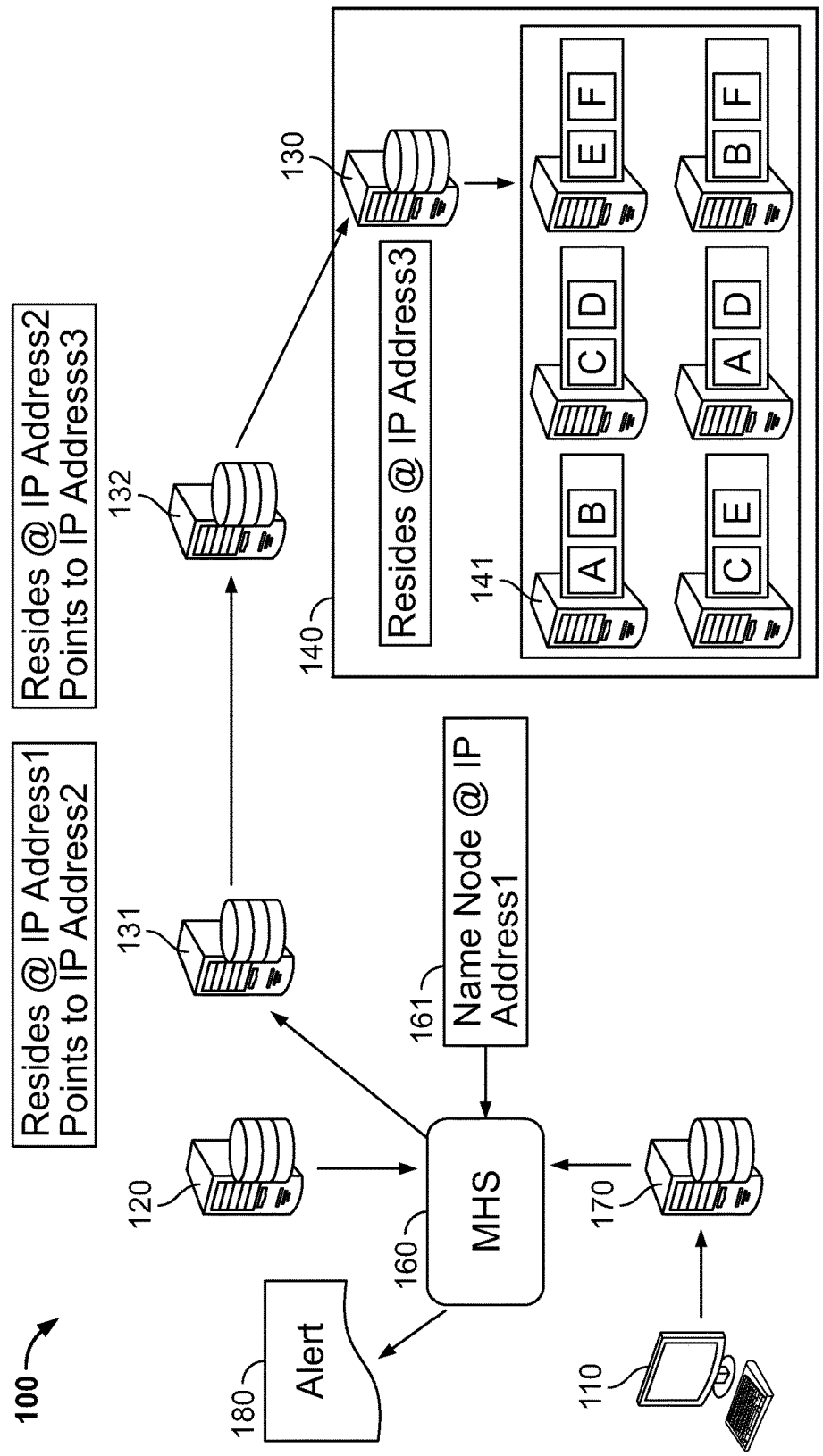
FIG. 2 is a second drawing illustrating a monitoring device for a layered distributed data environment.

As illustrated in FIG. 2, in an embodiment, name-node 130 may be in a layered configuration. The address within catalog 161 may be accessible by master host service 160 The catalog may direct access to one device at location 131 which in turn may be name-node 130 or contains another address 132 for the access process to follow. For purposes of this application, the number of layers of a name-node refers to the number of distinct data locations a signal passes through before it actually reaches the name-node itself. The number of layers can be any number including but not limited to within the range of 1-1000 or more.

Figure 3:
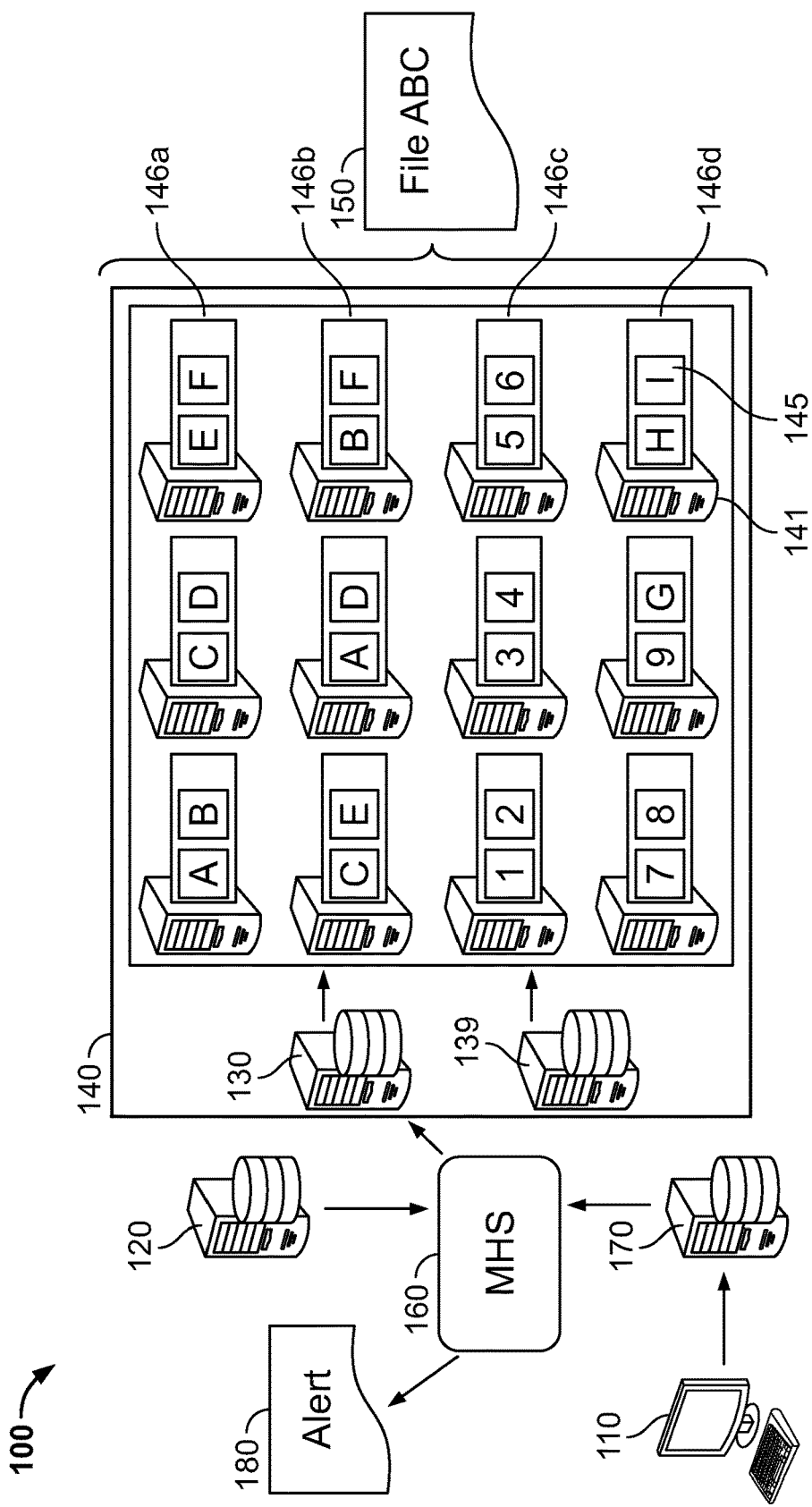
FIG. 3 is a third drawing illustrating a monitoring device for a standby node in a distributed data environment.
Figure 4:
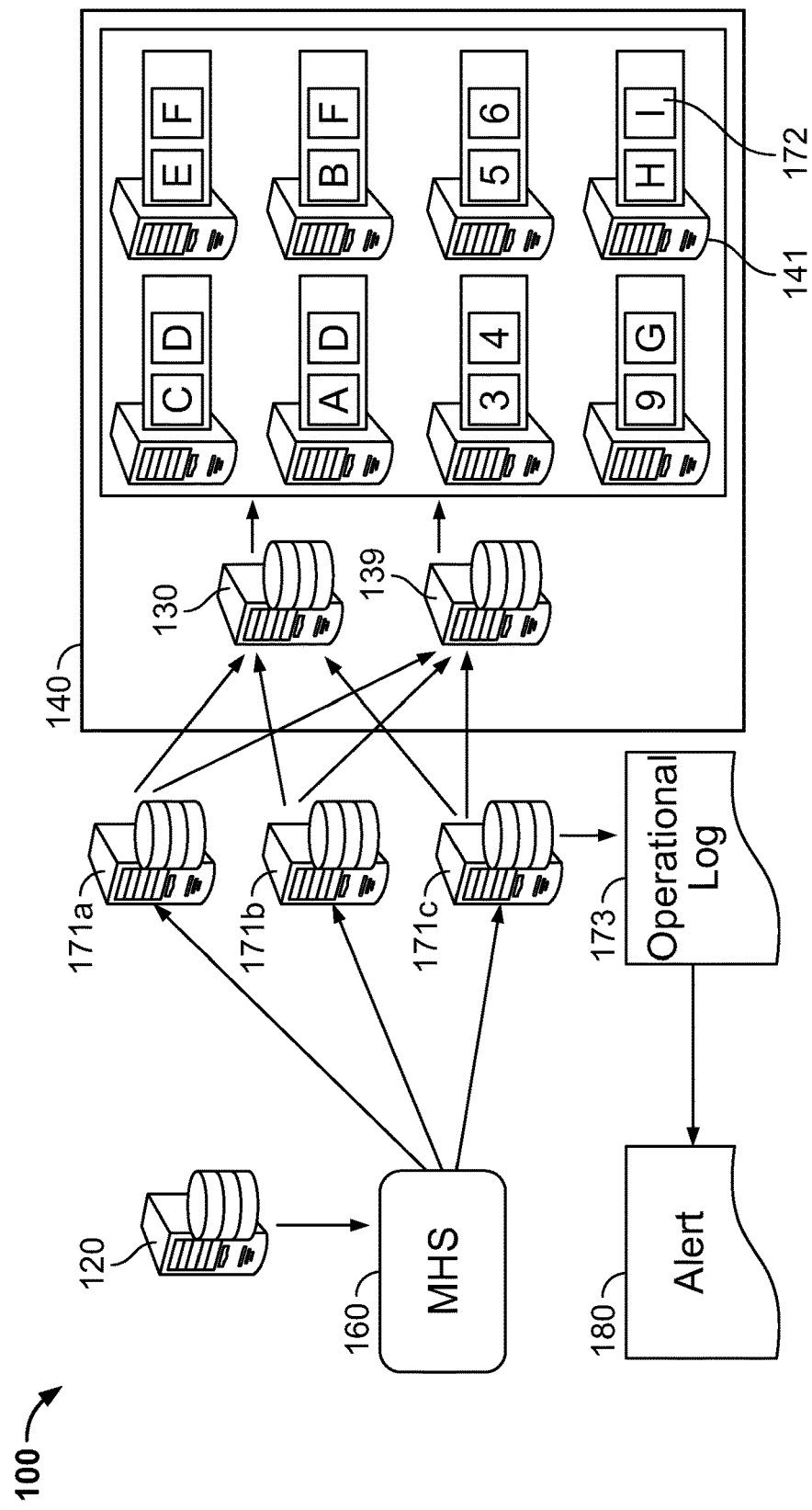
FIG. 4 is a fourth drawing illustrating a journal node for a monitoring device for a distributed data environment.

As further illustrated in FIG. 3, name-node 130 may be in direct communication with the data nodes 141. Name-node 130 and the data nodes 141 may make up cluster 140. Data nodes 130 may be devices bearing memory regions defining blocs 145. Data set 150 is distributed among the blocs 145. Name-node 130 is in communication with data nodes 140. Name-node 130 may administer external requests to access or alter the data set 150. In an embodiment, name-node 130 may perform diagnostics on itself. In an embodiment, the name-node 130 may perform a diagnostic on the data nodes 130.

In an embodiment, data nodes 130 of a cluster may be arranged according to racks. Racks may refer to actual rows, the devices that make up the data nodes. To illustrate this, in FIG. 3 there are 4 rows arranged within a first row 146a, a second row 146b, a third row 146c, and a fourth row 146d.

Referring again to FIG. 1, Client 110 may access distributed data environment 100 to access a data set 150. Dataset 150 may be made up of the file containing concatenated information ABCXYZ. Item A within cluster 1 bloc 1 on data node 1 in row 1. Item B may be within cluster 1 bloc 2 on data node 1 in row 1. Item C may be within cluster 1 bloc 3 on data node 2 in row 1. Item X may be within cluster 2 bloc 1 on data node 1 in row 1. Item Y may be within cluster 2 bloc 2 on data node 1 in row 1. Item Z may be within cluster 2 bloc 3 on data node 2 in row 1. When Client 110 accesses environment 100 and queries for data set ABCXYZ, the manager host service 160 may access the catalog to determine on which clusters and blocs each component of the data set resides, and the data address of the name-node for those clusters. Manager host service 160 may then accesses the clusters through the name-nodes.

As each of the devices making up the master node, data nodes, and name-nodes has their own and potentially very different parameters, lifecycles, remaining lifespans, operating systems, operating conditions, wear and tear, maintenance routines, storage conditions, and the like, each device may have very different probabilities of being online at any given moment. Also, at any moment, any one device may be undergoing maintenance, being upgraded, subject to attack or failure or any other condition which may impair it or take it offline. In addition, as these devices may be under the authority or responsibility of more than one entity, an impairment or offline status may occur without any warning to any client.

In an embodiment the distributed data environment further comprises one or more edge nodes 170. Edge nodes 170 may be devices managing communications between clients 110 and master node 120. Software may reside with edge nodes 170. The software may facilitate interactions between data set 150 and one or more services subject to the control of master node 120.

In an embodiment, master node 120 and or name-node 130 perform a diagnostic application which generates an alert message 180. Message 180 may include one or more of: a service component, a role component, a health component and threshold component. Alert message 180 may be sent to one or more of an administrator of distributed data environment 100, a user, and/or a service and/or person associated with recording, remedying, and/or addressing alert messages having one or more properties or components.

The role component may identify a specific role that a software or hardware application is performing within the distributed data environment targeted by the diagnostic. In an embodiment the roles may include but are not limited to an application performing one item selected from the group consisting of: batch data processing, database query/SQL, data streaming into or out of the environment, data searching, SDK, resource management, environment security, environment file systems, relational operability, structured system integrations and unstructured systems integrations.

Structured systems may include data sets accessible by the system whose format, layout, and distribution are consistently arranged according to schema definitions known to the system. Unstructured systems may include raw data sets such as emails, audit logs, market events, CCTV footage, sensor input, RFID input, web logs, streaming video, social media feeds, text messages, GIS data, news feeds and/or any combination thereof.

The service component may identify a specific hardware or software service performing a role. Representative commercially available services known to be applicable for performing roles on a distributed data environment include but are not limited to HADOOP, Apache HADOOP, Cloudera, Cloudera HADOOP, Spark, Hive, MapReduce, Impala, Solr, Kite, YARN, Hue, Pig, Sentry, RecordService, HDFS, Kudu, HBase, Sqoop, Flume, Kafka, Zookeeper and any combination thereof.

The health component may identify a specific service that is causing an effect on the distributed data environment outside of its expected role.

The threshold alert may identify that a specific service is operating beyond a pre-determined threshold. The threshold may be defined by a quantity of memory usage, power usage, network usage, communication usage, temperature, frequency of specific activities, ratio of active time to dormant time, computations or operations completed per given unit of time, and any combination thereof.

In an embodiment, the service generates a log file indicating metrics and events of its performance. The diagnostic comprises a perusal of the log file and a determination if the metrics and events conflict with pre-determined expected roles or threshold expectations. The log file may be updated by the service automatically at a exemplary frequency within the range of between every 0.001 seconds to every 100 days including one or more of every: 1 second, 5 seconds, 10 seconds, 20 seconds, 30 seconds, 1 minute, 5 minutes 10, minutes, 15 minutes, 20 minutes, 30 minutes, 1 hour, 1.25 hours, 1.5 hours, 2 hours, 10 hours, 12 hours, 24 hours, 2 days, 5 days, 7 days, 10 days, 25 days, 50 days, and any combination thereof.

In an embodiment, the diagnostic comprises a stateless protocol perusing the log file produced by a service. In a stateless protocol, neither the sender nor the receiver retains any information about the actual transmission between them. The only information retained is the substance of the log file perused by the diagnostic. By using stateless protocols, the processing speed of the diagnostic increases and therefore it can better approximate or actually achieve, a real-time evaluation of the service.

In an embodiment, the diagnostic is a REST-API type application. A REST-API comprises the use of a representational state transfer in which a request to access or manipulate text (which may be the log file) is performed in a stateless manner and makes use of a uniform predetermined operation. Making use of a pre-determined operation indigenous to the service allows for rapid and efficient access to the log file without the need to activate additional applications which may further slowdown the process.

In an embodiment, the environment comprises an event service. The event service is a service which maintains an overall log of some or all events that occur within some or all of the activities within the environment. The log archives items such as client and user access, service activation, instantiation, and deactivation, transactions, job start, progress, and completion, and any other observable activity occurring within the environment. When operating, the event service may reside on the master node, or on its own device (such as an event server) in communication with the master node and one or more resource management services.

As illustrated in FIG. 3, in an embodiment, standby node 139 is available for interaction with data nodes 141, in a manner substantially identical to the name-node 130. Based on information within a diagnostic review of name-node 130, the name-node 130 may be replaced in its function by standby node 139. This may be accomplished by physically deactivating name-node 130 or by disconnecting name-node 130 from the data node(s). In addition, or in the alternative, both name-node 130 and standby node 139 may both be functional and connected to the data nodes and both have a given designation (either at the master node or somewhere in cluster 140). One standby node of one name-node is designated as active and one as standby. In an embodiment, replacing a name-node with a standby node may involve changing their respective designations such that a device previously designated as standby is now designated as active and a device that was previously designated as active now has some other designation (including "standby", "offline", and/or any other suitable designation).

In an embodiment, the service may be a configuration application. A configuration application may have the role of operating a centralized operation for maintaining and synchronizing configuration information and settings between the master-node and some or all of the name-nodes. This configuration information may include the designations of the various devices within a cluster. The configuration information may also include changing which devices are designated as standby nodes and which devices are designated as active name-nodes.

In an embodiment, the diagnostic may be configured to maintain high availability arrangement for distributed data environment 100. In a high availability arrangement, distributed data environment 100 has multiple redundancies in various functional units. As a result, in the event of a failure of any given functional unit, the failure may not cause a bottleneck which may cause a portion of the dataset or any data processing capabilities to become unavailable. The presence of one or more standby nodes may prevent the failure of a name-node from rendering its associated cluster unavailable to the rest of the distributed data environment. FIG. 1 illustrate high availability for some of the data in the clusters. For example, data set A resides both in cluster 1 rack 1 bloc 1 and in cluster 1 rack 2 bloc 3. As a result, only if both data node 1 of rack 1 and data node 2 of rack 2 fail would data set A not be available. FIG. 1 illustrates high availability for all of data set ABCXYZ.

In an embodiment, the diagnostic may note a physical or operational parameter of the name-node. In response to the noted parameter, a suitable alert may be issued. The alert may include a service component. The service component may indicate resource management. The alert may include a role component. The role component may indicate the name of the software managing the name-node (for example Zookeeper). The alert may include a health component. The health component may indicate the physical, informational, or other suitable property. The alert may include a threshold component. The threshold component may indicate the relationship of the property.

In an embodiment, the name-node may be managing memory within the data nodes according to a cache arrangement. In a cache arrangement, in addition to a default data storage architecture available on a device, a second data storage architecture may also be present. The second data storage architecture may have smaller storage capability than the default data storage architecture, but faster access capability than the default architecture. Cache architecture may be used for data subsets which are frequently accessed, and whose constant re-retrieval from the default architecture would otherwise be more time consuming. In an embodiment, the log may be generated by a configuration application on the master node. The configuration application may manage cache properties on the name-node. In an embodiment, the diagnostic may detect a health or threshold variance in the allocation or operation of cache memory. In an embodiment, the diagnostic and alert may indicate a mismatch between a data set within cache whose properties are such that it should not be within cache. In an embodiment, the diagnostic and alert may indicate a mismatch between a data set not within cache whose properties are such that it should be within cache.

In an embodiment, the environment may also include at least three journal-nodes, for example journal nodes 171*a*, 171*b* and 171*c*. Each journal-node may be a device. The device may be configured to communicate with master node 120, name-node 130 of cluster 140, and standby name-node 139 of the cluster 140. Log 173 generated by the journal-node may indicate if a standby name-node has been activated or has not been activiated. In an embodiment, the diagnostic may count the number of journal-nodes that are indicated by log 173 as operational. In an embodiment, alert message 180 may be generated if two or more journal-nodes are not functioning.

In an embodiment, alert message 180 may include a service component. The service component may indicate resource management. Alert message 180 may include a role component. The role component may indicate the name of the software managing the name-node (for example Zookeeper), a health component indicating the non-operation of a number of journal nodes. Alert 180 may include a threshold component. The threshold component may indicate the no more than two journal nodes are to be offline at any given moment.

In an embodiment, the diagnostic may determine if a balancer is operational. A balancer may be an application which balances the allocation of memory resources (such as disk space) among the blocs of a cluster. The balancer may re-allocate resources when one or more data nodes become full, when additional data nodes join the cluster or at any other suitable instance. A balancer may keep track of both how much overall space there is available within the cluster and if the data is allocated among the bloc efficiently. A balancer may also adjust the data within the cluster to increase efficiency to increase storage capability, reduce retrieval time, or for any other desirable objective.

In an embodiment, the balancer may allocate data among the blocs to facilitate concurrent access and alterations of the data. For example, if different data units are stored within different blocs, concurrent activities such as reading, writing or deleting data units, may be accomplished without problem. If the two different data units are within the same bloc (for example if they are the same or overlapping data units), the concurrent activities may require coordination such as determining priority or right of way access, locking out one client until another is finished, etc. Coordination between data units may slow the process. As a result, failure of the balancer to operate properly may not necessarily cause the cluster to fail but it may impair its productivity.

In an embodiment, the diagnostic may determine if the balancer is operational or is not. In an embodiment, the diagnostic may intuit if the balancer is operational by one or more of a plurality of parameters. The parameters may include: Evaluating the time entries or other data within a log generated by the balancer, comparing the allocation of data units within the blocs to pre-determined criteria, measuring the time required for completion of concurrent activities.

In an embodiment, an alert message may be generated if the balancer is functioning poorly or failing. The alert message may include a service component. The service component may indicate resource data node management. The alert message may include a role component. The role component may indicate the name of the software managing the name-node (for example, Balancer). The alert message may include a health component. The health component may indicate the non-operation of a balancer. The alert message may include a threshold component. The threshold component may indicate that data units located in the blocs are contrary to pre-determined, operational parameters.

In an embodiment, the diagnostic may determine if an edge node is operating and whether it is operating properly. In the event that the diagnostic indicates that the edge node is not operating, or operating poorly, an alert message or remedy may be generated.

Figure 5:
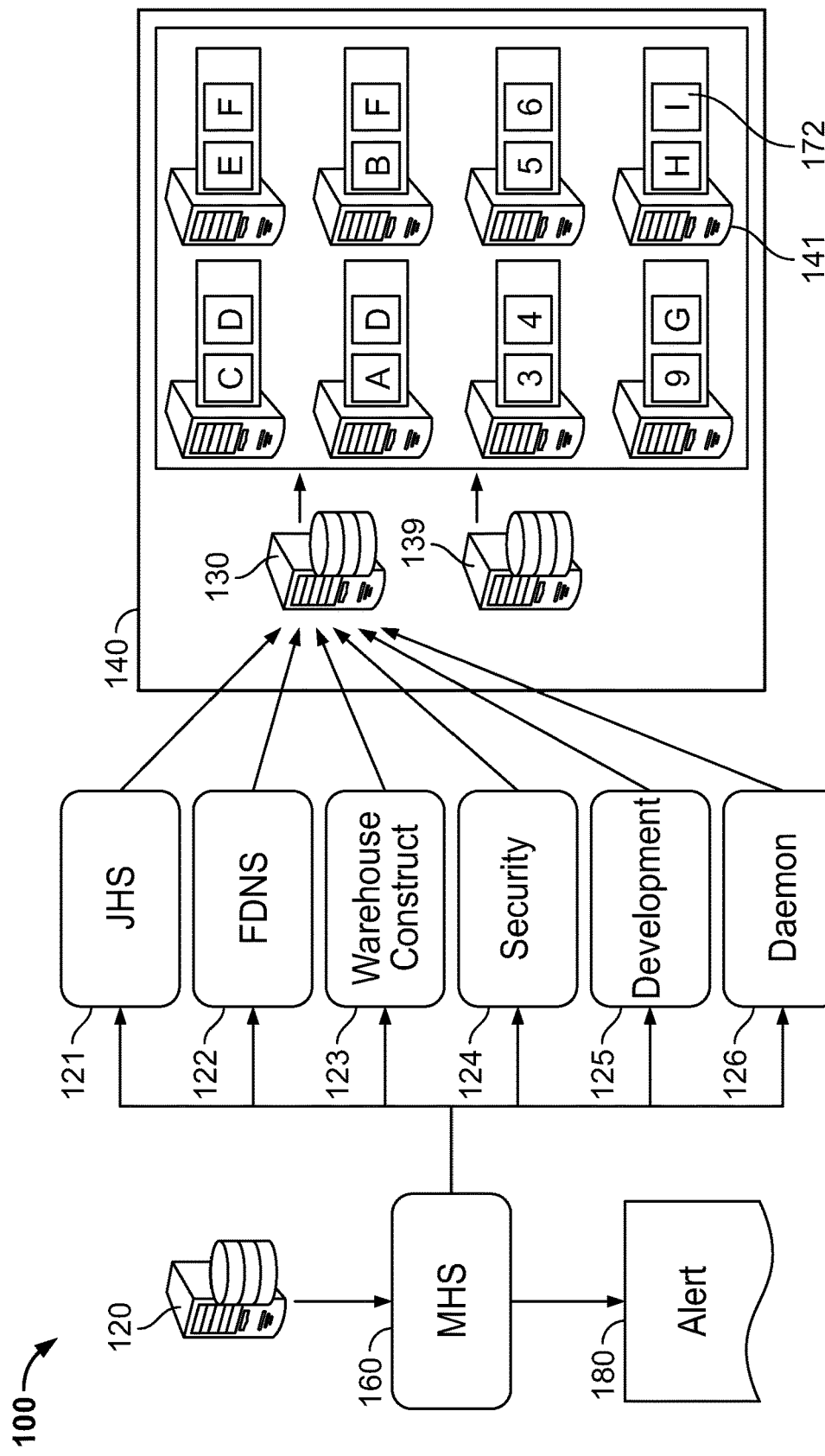
FIG. 5 is a fifth drawing which illustrates multiple service applications for a monitoring device for a distributed data environment.

As illustrated in FIG. 5, in an embodiment, the diagnostic may involve scrutinizing the FDNS (Forward domain name service) The FDNS may be used to locate the edge node. Typically, when attempting to access data over a network such as the internet, a human-friendly URL (uniform resource locator) is entered. The URL is converted into an IP address. The IP address is used by the execution code to locate the data's location. The conversion from URL into IP address occurs by FDNS where a domain server, which contains an index of URLs and IP addresses, is accessed. One reason why the node may not be accessible may be because FDNS index 122 is incorrect or no longer up to date. In such a case, an alert message may be generated. The alert message may indicate the FDNS for the edge node may be changed to an FDNS corresponding to an operational edge node. The alert message may include a service component. The service component may indicate Gateway. The alert message may include a role component. The role component may indicate the name of the software managing the name-node (for example YARN or HDFS), a health component indicating the non-operation of an edge node or FDNS, and a threshold component indicating that clients cannot access the environment using the edge node or FDNS at issue. In an embodiment, the edge node or FDNS may be changed in response to the alert message.

In an embodiment, the diagnostic may determine if, when a name-node was discontinued to be used as a name-node (i.e. a former name-node), if there was a job such as a data processing job, system maintenance job running on the name-node. If a job was running on the former name-node when it was discontinued, the diagnostic may also determine if a standby was activated as a replacement name-node. If the former standby node was activated as the now current name-node, the job needs to be reactivated on the now current name-node. The alert message may comprise this information. The job may be restarted on the former standby node now name-node.

In an embodiment, the diagnostic may address JHS (Job History Server) application issues. JHS 121 is an application which stores a listing of jobs performed and/or performing on distributed data environment 100. It may be indexed or listed by the job's individual client requestor, functional unit, device, service, location, and any combination thereof. In an embodiment, the diagnostic may determine if the JHS is operating and whether it is operating properly.

In the event that the diagnostic indicates that the JHS is not operating properly or operating poorly, an alert message may be generated. The alert message may include one or more of: a service component indicating resource manager, a role component indicating the name of the software managing the JHS (for example YARN or Cloudera), a health component indicating the non-proper-operation of the JHS and/or a threshold component indicating that clients cannot access the JHS at issue. In an embodiment the master node or an application residing thereon may be restarted in response to the alert message.

In an embodiment, the system may facilitate high availability for JHS. The system may maintain a backup of JHS data and run a diagnostic of the JHS. If the diagnostic indicates a problem, the JHS application may be restarted and the backup JHS data may be appended into the JHS listing created by the newly started JHS application. In an embodiment, the diagnostic may compare the resulting JHS listing with other metrics of system operations related thereto to detect defects or errors in the JHS application.

In an embodiment, the diagnostic may address warehouse techniques for processing of database queries. In distributed data environment 100, it is inefficient for a query to scan every bit within every bloc and cluster (i.e., a low-level scan) because the massive amount of data in the dataset and the widespread distribution of the various constituents of the data set makes this process very slow. Instead, a high-level item which may not be included within the default clusters but instead within an array which mirrors the attributes of some of the contents of the default clusters over a relatively few number of clusters or on one cluster, which are more readily accessible, a warehouse construct 123, may be constructed. Warehouse construct 123 may contain a consolidated abbreviated representation of the data that resides within the clusters. As a smaller consolidated array, warehouse construct 123 may facilitate queries which may be completed much more rapidly. Warehouse construct 123 may contain schema and locations of various database tables. Warehouse construct 123 may include metadata. The metadata may help to rapidly identify and locate relevant data within specific blocs. Warehouse construct 123 may also be configured for use by other applications in the distributed data environment such as batch processing applications. Representative examples of warehouse constructs include MapReduce and HiveMetastore.

The warehouse technique may make use of a number of warehouse applications to accomplish the search. A driver may be an application which starts a session by receiving a query from a client, receives the result of the query, monitors the progress of the query, and returns the result to the client. A compiler may be an application which creates an execution plan to optimally navigate between warehouse information and germane data locations within clusters and to assemble an efficient search pattern for the query. An optimizer may transform the execution plan to increase efficiency by executing actions such as consolidating logic steps and splitting and re-ordering tasks to increase performance and scalability. An executor may coordinate with the software operated by the master node to implement the query within the distributed data environment. Representative examples of query programs used with a warehouse technique may include Hive and Impala.

In an embodiment, the diagnostic may determine if one some or all of the warehouse, compiler, optimizer, driver, and/or executor are operating and, operating properly. In an embodiment, the diagnostic may be used to assure high availability of the warehouse technique. Achieving this assurance may include housing mirrored warehouse constructs and duplicate executable copies of the compiler, optimizer, driver, and/or executor on a standby redundant device. This may include determining that the redundant devices are in operation, transferring operation from a standby device to an active device upon detection by a diagnostic of a deviation above a threshold of a property, This may include implementation of a new standby device.

In an embodiment, the diagnostic may address granular security protocols 124. In distributed data environment 100 there may be a huge array of possible clients, different regions of the dataset and different data processing activities or maintenance activities that can potentially be performed. Granular security protocol 124 may allow for proper authorization, the allocation to specific users or clients of very specific permissions to very specific regions of the data set and/or only the ability to perform very specific activities. A representative application suitable for implementing a security service may be Sentry or RecordService.

In an embodiment, the diagnostic may determine if one, some or all of the applications of granular security protocol 124 are operating and operating properly. In an embodiment, the diagnostic may be used to assure high availability of granular security protocol 147. Achieving this assurance may include housing mirrored devices operating the granular security protocol on a standby redundant device, determining that the redundant devices are in operation, transferring operation from a standby device to an active device upon detection by a diagnostic of a deviation above a threshold of a property, and implementation of a new standby device.

In an embodiment, the diagnostic may address application development tools 125. In distributed data environment 100, application development tools, and in particular, graphical user interface-using application development tools, may use internal components, and components distributed within the clusters. The components may include both information which may be stored within a warehouse construct and/or within one or more development libraries. These libraries may include pre-written code, classes, procedures, scripts, functions, configuration data and other items which may become components of a development. A representative development tool service may be Hue or Kite.

In an embodiment, the diagnostic may determine if one some or all of the applications of a development tool which may include the libraries and components of the warehouse construct, are operating and operating properly. In an embodiment, the diagnostic may be used to assure high availability of the development tool. Achieving this assurance includes housing mirrored devices operating the granular security protocol on a standby redundant device. Determining that the redundant devices are in operation, transferring operation from a standby device to an active device upon detection by a diagnostic of a deviation above a threshold of a property, and implementation of a new standby device. In an embodiment, upon detection by the diagnostic of a problem with the warehouse construct or library, the device housing the warehouse construct or library may be deactivated and reactivated in such a manner that only the client using the development tool is impacted by the loss of operation.

In an embodiment, the diagnostic may address daemon health store issues. A daemon 126 may be an application operating in the background of distributed data environment 100 and is not under the interactive control of a standard client or user. Only one or some superusers may have interactive control of daemon 126. A daemon health store may be a daemon which receives and stores the cumulative results of health queries run against each of the data nodes of a cluster of distributed data environment 100. The daemon health store can be used to decide how to distribute data between different clusters or within a specific cluster. When daemons fail, the clusters may continue to operate but will, over time become less robust and efficient and may eventually fail. A representative daemon health store is Impala StateStore.

In an embodiment, the diagnostic may determine if one some or all of the daemons of a service, including but not limited to a daemon health store are operating and operating properly. In an embodiment, the diagnostic may be used to assure high availability of the daemon service. Achieving this assurance may be accomplished several ways. Some of those ways include housing mirrored devices operating the daemon service on a standby redundant device, determining that the redundant devices are in operation, transferring operation from a standby device to an active device upon detection by a diagnostic of a deviation above a threshold of a property, and implementation of a new standby device.

In an embodiment, distributed data environment 100 may configured to operate a particular number of daemons and/or warehouse constructs operating at a time. While the environment itself may remain functional if a portion of the daemons and/or warehouse constructs fail, if a portion greater than a predetermined portion fail, the environment may become impaired. A diagnostic may evaluate how many daemons and/or warehouse constructs are in operation at a time. If the number of operating daemons and/or warehouse constructs are below a predetermined threshold, an alert message may be issued. As a remedy, additional daemons and/or warehouse constructs may be activated. In some embodiments, the configured number of daemons and/or warehouse constructs may be within the range of 2-100 or higher and the predetermined threshold may be crossed if the threshold drops to 1-99 or higher.

In an embodiment, distributed data environment 100 may utilize encrypted communications. Some or all of the communication within the environment, such as communications between various nodes and communications between the environment and outside entities, for example an entity hosting a client accessing data within a cluster over the internet, may be across a medium exposed to interception by outside parties such as the internet. A first step towards protection against such interception is encryption of communications. Encryption is typically done by applying an algorithm such as a key-based algorithm, known to all the intended parties of the communication, to a plain-version of the message before sending it in cipher-format to the intended recipient. The recipient then converts the cipher-format back into plain-format.

In an embodiment, the diagnostic may address workflow coordinator issues. In distributed data environment 100, a workflow coordinator is an application which efficiently allocates resources to process jobs mandated by users and clients. The workflow coordinator may collect the job requests and arrange them into a Directed Acyclic Graph (DAG). The DAG may take into account items such as job chronology, efficiencies for bundling recurring jobs, jobs dependent on clusters in specific locations, rules for beginning and ending a workflow, execution paths and decisions, and logic forks and joins to construct a detailed sequence of when and how each requested job actually is performed. The DAG sequence also utilizes data from the warehouse construct. A representative example of a workflow coordinator is Oozie.

Figure 6:
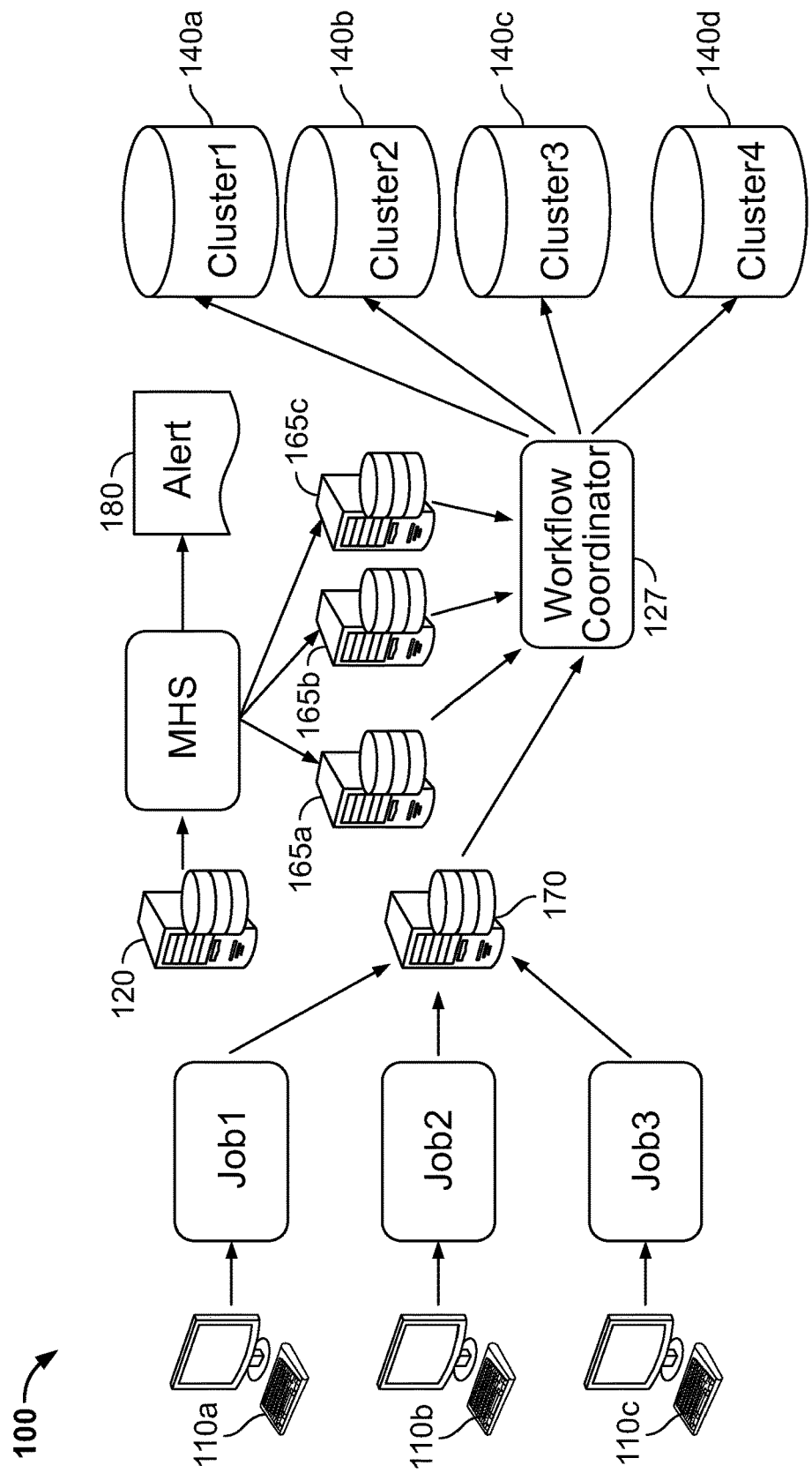
FIG. 6 is a sixth drawing illustrating a workflow coordinator for a monitoring device for a distributed data environment.

As illustrated in FIG. 6, in an embodiment, the distributed data environment 100 is configured to operate a particular number of hosting devices 165a, 165b, 165c. The hosting devices collectively host the simultaneous operation of one or more instances of a workflow coordinator 127 and a warehouse construct 123 at the same time. While the environment itself may remain functional if some of the hosting devices fail, if enough hosting devices fail the environment will become impaired. A diagnostic may evaluate how many hosting devices supporting workflow coordinators and/or warehouse constructs are in operation at a time. If the number operating is below a predetermined threshold, an alert message may be issued warning of this situation. As a remedy, additional warehouse coordinator and/or warehouse construct hosting devices may be activated. The configured number of daemons and/or warehouse constructs may be within the range of 2-100 or higher and the threshold may be crossed if it drops to 1-99 or higher.

In an embodiment, the diagnostic addresses high availability cluster issues. To achieve high availability, within a cluster, one or more copies of each bloc is redundantly stored on one or more other data nodes. As a result, if a data node fails, its blocs are still accessible via its position on one or more of the redundant data nodes. A diagnostic may evaluate how many data nodes are active and specifically determine if a data node's failure reduces the number of bloc copies to below an acceptable threshold. If below, an alert message may be issued warning of this situation. As a remedy, additional data nodes may be activated or more blocs may be distributed among currently active data nodes within the cluster or within another cluster. The configured number of blocs and/or data nodes may be within the range of 2-100 or higher and the threshold may be crossed if it drops to 1-99 or higher.

In an embodiment, the diagnostic addresses evaluations of daemon meta-data. Meta-data is data associated with information that provides descriptive attributes of data. Three distinct types of meta-data items exist: descriptive meta-data, structural meta-data, and administrative meta-data. The diagnostic may peruse all three types for the affirmation.

Descriptive meta-data describes information associated with discovery and identification. It can include elements such as title, abstract, author, and keywords. Structural meta-data is meta-data describing information associated with the containers of data and indicates how compound objects were put together, for example, how pages are ordered to form chapters. It includes the types, versions, relationships and other characteristics of digital materials. Administrative meta-data describes information associated with managing resources, such as when, where, and how it was created, file type, and other technical information, and who can access it.

In an embodiment, the diagnostic compares actual detected meta-data with expected archival values associated with the meta-data. Because meta-data is associated with the actual creation or use of a data set, the presence of meta-data should be consistent with the presence of external associated archival data. For example, if a meta-data tag indicates that a specific daemon created a file at a certain timestamp, a system activity archive should indicate that the same daemon was active at that timestamp. In the event of a conflict between meta-data and an associated archive value, an alert message is issued indicating the conflict. A remedy to be implemented is refreshing the archive to state the correct meta-data value.

In an embodiment, the diagnostic addresses data stream issues. As previously stated, one strategy utilized by a distributed data system to handle massive amounts of data is to come to the data. Coming to the data refers to the process of remotely executing software code, requested by one device, on or near another device which either is or is close to the very device on which the data resides. Notwithstanding the general policy of coming to the data, a distributed data environment still involves moving around vast amounts of data. These vast amounts of moving data are often handled by one or more data stream services.

Data stream services efficiently stream data using several techniques. Such techniques include designating discrete sources and sinks for specific categories of data, moving services facilitating efficient bundling and unbundling of commonly routed data, defining specific channels for transporting data with various properties (capacity, transmission rate), efficiently allocating streams to appropriate channels, and creation of multi-hop and multi-branched stream paths to prevent bottlenecks and change paths in the event of changing circumstances (such as operability of a channel) or changing priorities. A representative example of a data stream service is Flume and a data stream application is a Flume Agent.

Figure 7:
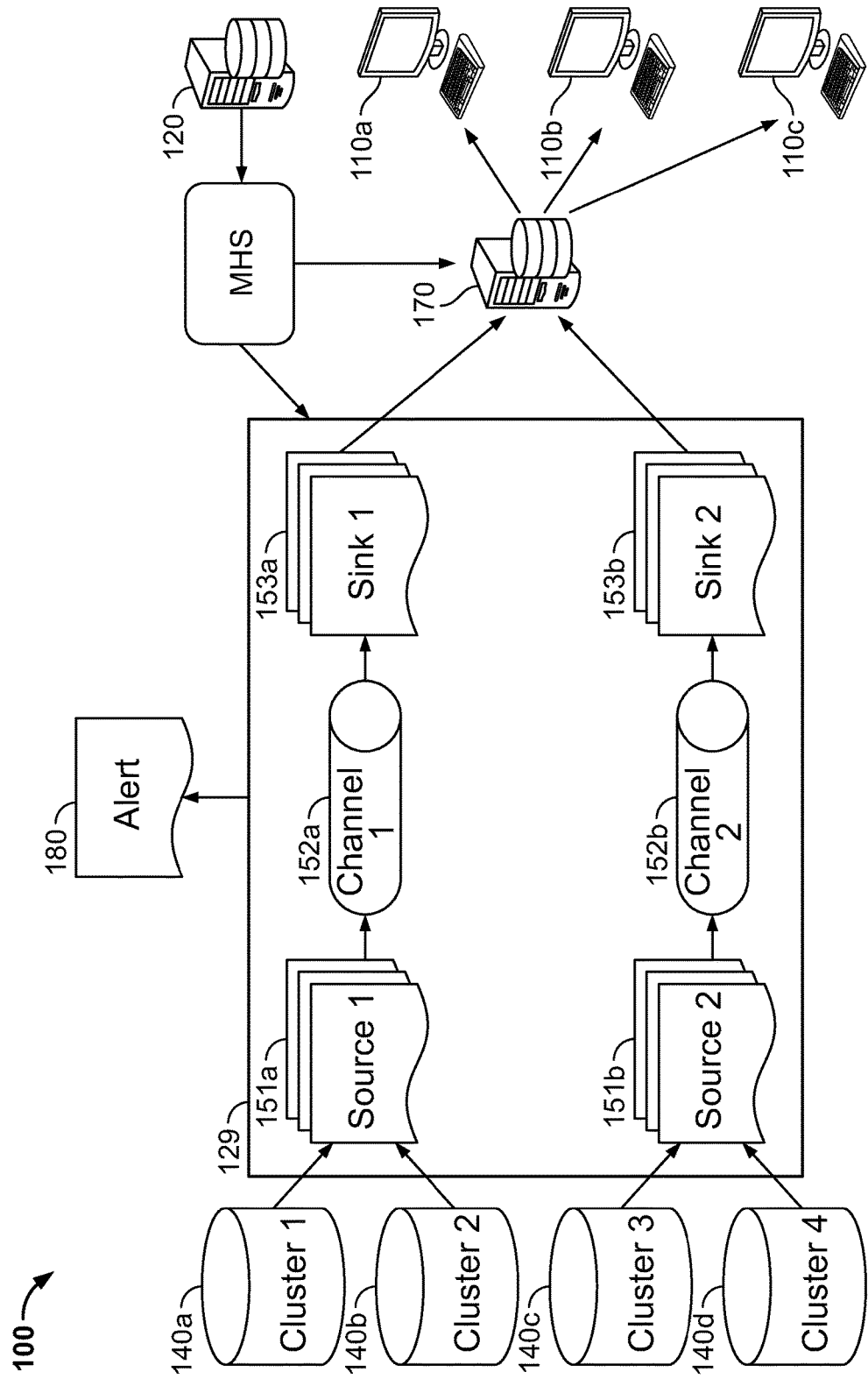
FIG. 7 is a seventh drawing illustrating a data stream coordinator for a monitoring device for a distributed data environment.

FIG. 7 shows an embodiment where the diagnostic measures the number and health of active data stream applications shown at 129 as well as components thereof such as bundling sources 151a and 151b, unbundling sinks 153a and 153b, channels 152a and 152b), multi-branch paths and multi-hop paths. A diagnostic may evaluate how many data stream applications and components thereof are active or are acceptably healthy, and specifically determine if the number of applications or their health are below an acceptable threshold. An alert message may be issued when a data stream application or components thereof fall below a predetermined threshold. As a remedy, additional applications or components may be activated. In an exemplary embodiment, the desired number of active applications in operation may be within the range of 2-100 or higher and the threshold may be crossed if it drops to 1-99 or higher. The diagnostic may also audit the categorization performed by the bundling source to determine if it is incorrectly including or excluding items from the bundles.

In an embodiment, the diagnostic addresses messaging issues. In a distributed data environment, messaging is also often accomplished via a bloc-cluster arrangement. A messaging service may receive messages from writers, store them among blocs within clusters, and make appropriate partitions of the blocs and clusters available to proper recipients. The name-node may allocate the written messages received from a user among partitions which are distributed among blocs. Similarly, the name-node may distribute a receiver's messages among a partition distributed among blocs. When a user attempts to read or write messages, a messenger service running on the name-node may direct the user to the correct partition. A representative example of a messaging service is Kafka.

In an embodiment, the diagnostic may address messaging service cluster issues. To achieve high capacity within a cluster, one or more copies of each bloc may be redundantly stored on one or more other data nodes. As a result, if a data node fails, its blocs are still accessible via its position on the one or more of the redundant data nodes. Similarly, one or more standby nodes may be in operation to address a name-node failure. The diagnostic may evaluate how many data nodes or standby nodes are active, and specifically determine if a failure reduces the number of bloc copies or standby nodes to below a predetermined threshold. An alert message may be issued when the number of bloc copies or standby nodes are determined to be less than the predetermined threshold. As a remedy, additional data nodes, name-nodes, or standby nodes may be activated or more blocs may be distributed among currently active data nodes within the cluster or within another cluster. In an exemplary embodiment, the configured number of blocs, data nodes, name-nodes, and standby nodes, may be within the range of 2-100 or higher and the threshold may be crossed if it drops to 1-99 or higher.

In an embodiment, the diagnostic may address heap issues. Heap may refer to the runtime data area from which memory for instances of services and arrays related thereto are allocated. Heap may reside on the master node and/or one or more other nodes. Portions of the heap dedicated to operating Java class-based services may be referred to as the JVM (Java Virtual Machine) heap. Heap performance may be monitored by a resource management service. The total amount of memory reserved for a heap may be referred to as the allocated heap. Used heap may be the amount of allocated heap currently in use by the services running on the distributed data environment.

In an embodiment the diagnostic may be configured to detect if used heap exceeds a threshold percentage of allocated heap within a range of 1%-99% or if used heap exceeds a data size within a range of 1 MB to 1000 TB or higher. The heap may be memory residing on any one of a name-node, a data node, a journal node, a master node, an edge node, event server and any combination thereof. The diagnostic may be based on determining if an individual service is exceeding its allocated data size or percentage of allocated heap. Any service operating within a heap may be evaluated. Such services may include but are not limited to node managers, job histories, resource managers, workflow managers, balancers, name-node managers, data auditors (which may capture a complete record of some or all activity within the environment), accessing privilege verification (scrutinizing who is accessing which data and how), meta-data analysis, job processors, job schedulers, batch processors, data transfers, data purges, data analytics (evaluating and predicting patterns of data and service usage), data encryption and cryptography, manager host service, and event logging or log. In an embodiment, the diagnostic may be configured to detect an operating service whose heap use exceeds a threshold percentage of allocated heap within a range of 1%-99% whose used heap exceeds a data size within a range of 1 MB to 1000 TB or higher.

In an embodiment, the diagnostic of a node may be performed via actual or mirrored edit log checkpointing. An efficient way of evaluating a node is to peruse a record of all the node's meta-data. This metadata may be an effective snapshot of what is actually occurring within the node and its evaluation can give information regarding its health and availability. Transcribing the metadata, however, may be a resource intensive activity so the node may be unavailable for client use while the node's metadata is being transcribed. As a result, after an initial meta-data transcription, an edit log may be maintained. The edit log maybe a sequential list of subsequent changes that occurred to the node' metadata since the transcription. Thus, a node's current status may be intuited by reading the metadata transcript, and then editing that transcript according to the sequence listed in the edit log. Checkpointing may be the process of evaluating an edit log modification of a meta-data transcript to determine the status of a node.

In an embodiment the diagnostic may result in a final report. The final report may be used to determine if an alert and/or remedy should occur. Creating the final report may involve disregarding various elements of an edit log modification of a meta-data transcript. Edit logs related to activities occurring the day the checkpoint is run are removed from the edit log modification of a metadata transcript. Edit logs related to activities which occurred on all of a range of number of days prior to the day the checkpoint is run, may be added to the edit log modification of a meta-data transcript for the day the checkpoint is run. In an exemplary embodiment, the range of the number of days may between 1-1000 days. The removal of the edit logs from the day the checkpoint is run is done to avoid misinterpretations of the transcript resulting from jobs that have been started but not yet completed when the checkpoint was initiated.

In an embodiment, more than one service may be recording meta-data, and the result may be more than one edit log modification of a meta-data transcript. As the services may utilize different heuristics or may observe different activities, when the services transcribe or modify metadata, the services edit log modification of a meta-data transcripts may differ. In an embodiment, the final report may include all activities noted by one service but not by another.

In an embodiment, the diagnostic may address keytab file issues. A keytab file may be a file containing encrypted keys to allow scripts to automatically authenticate a user or client without requiring human interaction or access to a password stored in a plain-text file. As various services scrutinize the keytab files, at times the services process the keytab files in a name-based keytab format, which may be alphanumeric, and at times process it in a universal unique identifier format, which may be purely numeric. Because the keytab information is by design encrypted, it cannot be easily accessed or copied. As a result, when a job utilizes keytab files and multiple services, incompatibility in the keytab format shared between the services may cause the job as a whole to fail. In an embodiment, the diagnostic detects inconsistent use of keytab formats among the services in a job. The diagnostic may retrieve this information from metadata associated with some or all of the services. An alert message may be issued if an inconsistency is detected before or after a job fails. A remedy may be to re-run the job with the insertion of a different user or client, such as the superuser of the service itself, which may be immune to such keytab inconsistencies.

Figure 8:
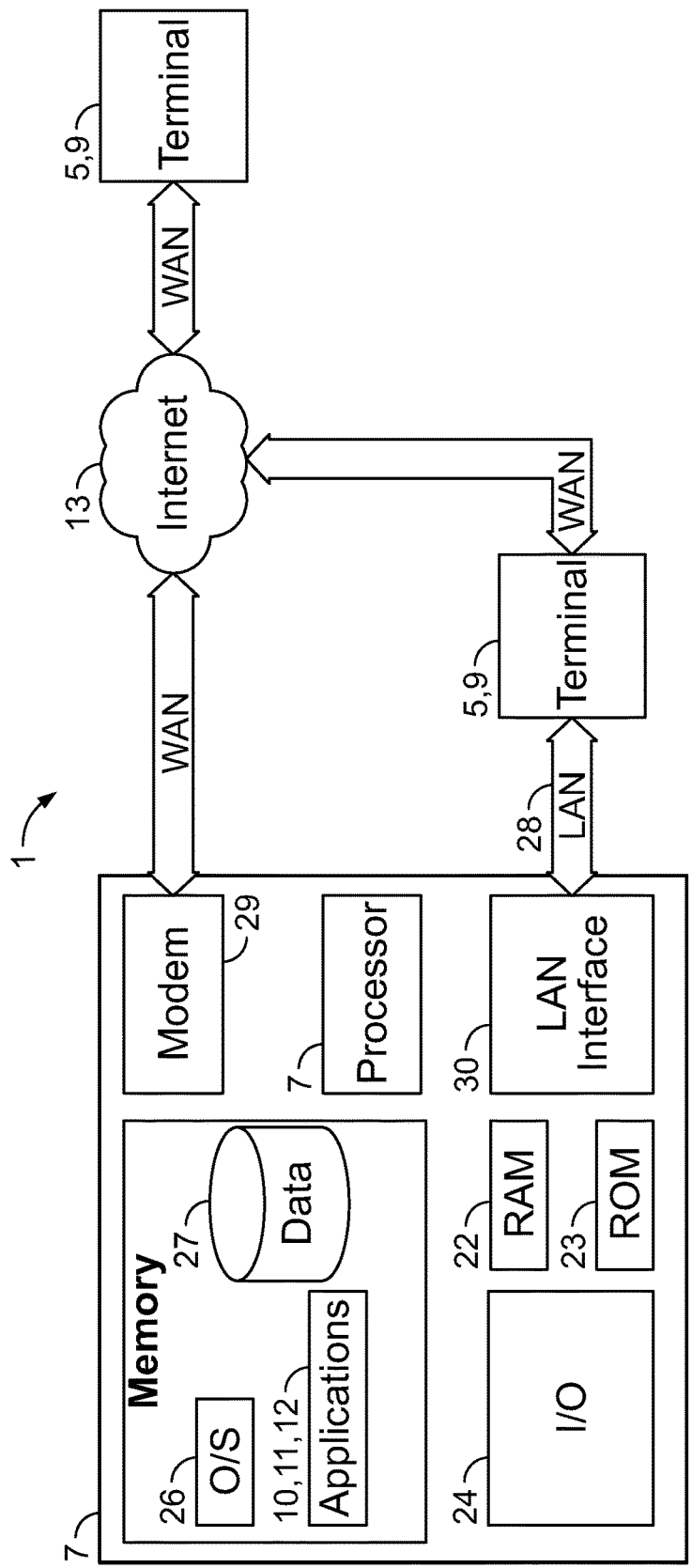
FIG. 8 is an eighth drawing illustrating software and hardware suitable for a master entity or other entities.

Any one, some, or all the constituents of the distributed data environment, including any or all of its services, nodes, clusters, blocs, and constituents thereof, may manifest within one or more computer systems. As illustrated in FIG. 8, the computer system 1 may have a processor 7 for controlling the operation of associated components, and may include RAM 22, ROM 23, input/output modules 24 and a memory 25. The processor 7 may also execute all software running on the computer—e.g., the operating system, consent applications 10, 11, 12, and authorization applications. Other components commonly used for computers such as EEPROM or Flash memory or any other suitable components may also be part of the computer system.

The memory of the computer system may be comprised of any suitable permanent storage technology—e.g., a hard drive or cloud based storage. The memory stores software, including the operating system of any application(s), along with any data 27 needed for the operation of the computer system. Alternatively, some or all of computer executable instructions may be embodied in hardware or firmware. The computer executes the instructions embodied by the software to perform various functions.

The computer system may be connected to other computer systems via a local area network (LAN) 28, a wide area network (WAN) 29, or other network arrangement. The system may operate in a networked environment supporting connections to one or more remote computers, such as terminals 5, 9, personal computers, or servers that include many or all of the elements described above relative to system. The network may be interconnected via adaptors, modems 29, interfaces 30 or other communication medium including the internet 13.

It will be appreciated that any known network connections or other means of establishing a communications link between the computers may be used. The existence of any of various well-known protocols such as TCP/IP, Ethernet, FTP, HTTP and the like is presumed, and the system can be operated in a client-server configuration to permit a user to retrieve applications such as web pages from a web-based server. Any of various conventional web browsers can be used to display and manipulate data on web pages.

The computer system may also include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; logical processing device, which may compute data structural information, structural parameters of the directed graph and/or language model and machine-readable memory. Components of the computer system may be coupled together by a system bus or other interconnections and may be present on one or more circuit boards. In some embodiments, the components may be integrated into a single chip. The chip may be silicon-based.

While this invention may be embodied in many different forms, there are described in detail herein specific preferred embodiments of the invention. The present disclosure is an exemplification of the principles of the invention and is not intended to limit the invention to the particular embodiments illustrated. All patents mentioned herein or mentioned, are incorporated by reference in their entirety. Furthermore, the invention encompasses any possible combination of some or all of the various embodiments described herein and/or incorporated herein. In addition, the invention encompasses any possible combination that also specifically excludes any one or some of the various embodiments described herein and/or incorporated herein.

The above disclosure is intended to be illustrative and not exhaustive. This description will suggest, many variations and alternatives to one of ordinary skill in this art. All the alternatives and variations are intended to be included within the scope of the claims where the term "comprising" means "including, but not limited to". Those familiar with the art may recognize other equivalents to the specific embodiments described herein which equivalents are also intended to be encompassed by the claims.

Those skilled in the art may recognize other equivalents to the specific embodiment described herein which equivalents are intended to be encompassed by the claims attached hereto.

What is claimed is:

1. A system for executing a computing application within a distributed data environment, the system comprising:
   a plurality of clusters, a plurality of clients, and a master node;
   the master node is a non-transitory computer readable medium configured to perform diagnostics of the system, the diagnostics comprising:
      monitoring and measuring communications between clients and clusters, and
      aggregating and analyzing at least a portion of that which is monitored by at least one name-node;
   the system is configured to generate an alert message when a diagnostic reveals a measured value exceeding a pre-determined threshold value;
   each cluster comprises a dataset, a name-node, a standby name-node, and a plurality of data-nodes;
   each dataset is information distributed among a plurality of blocs, each bloc comprising memory residing on at least one data-node;
   each data-node is a non-transitory computer readable medium;
   each name-node is associated with a unique identifier and comprises a processor configured to:
      receive and reply to requests for reading access and writing access to a dataset,
      monitor its own operability and the operability of each data-node,
      monitor used capacity and overall capacity of the plurality of blocs, and
      instruct a data-node to create, delete, or replicate blocs in response to a ratio between the used capacity and the overall capacity;
   each client is a non-transitory computer readable medium configured to communicate with a name-node and make requests for reading access and optionally writing access to a dataset;
   each standby name-node is configured, when in an active state, to operate substantially identically to a name-node;
   the master node is further configured, in response to receiving the alert message and validating the alert message, to place a name-node into de-active state and place a standby name-node into active state.

2. The system of claim 1 wherein each alert message comprises a service component, a role component, a health component, and a threshold component.

3. The system of claim 2 wherein the role component is a service role selected from the group consisting of batch data processing, database query/structured query language ("SQL"), data streaming into or out of the environment, data searching, software development kits ("SDKs"), resource management, environment security, environment file systems, relational operability, structured system integrations, and unstructured system integrations.

4. The system of claim 1 wherein the master node has a processor running a workflow scheduling software application, and the diagnostic comprises communications with a particular name-node via an application programming interface utilizing a representational state transfer between the workflow scheduling software application and the particular name-node.

5. The system of claim 1 wherein the alert message comprises a health component indicating a probability that a severity of failure of a name-node is in excess of a pre-determined threshold value, and the validating comprises determining that a probability of a standby name-node failing before a second standby name-node is installed at the cluster is below a pre-determined threshold value.

6. The system of claim 5 wherein the system further comprises at least three journal-nodes, each journal-node is a non-transitory computer readable medium communicating with the master node, a name-node of a cluster, and a standby name-node of a cluster, one of the three journal-nodes indicating to the master node if the standby name-node of the cluster has been activated, the alert message indicating that at least two journal-nodes are not functioning.

7. The system of claim 5 wherein the system comprises a first cluster, a second cluster, a first database query system compatible with a name-node or a data-node of the first cluster but not compatible with a name-node or a data-node of the second cluster, and a second database query system compatible with the name-node or the data-node of the second cluster but not compatible with the name-node or the data-node of the first cluster, the master node containing an application capable of receiving a query, wherein the master node applies the first database query system to the first cluster, applies the second database query system to the second cluster, and aggregates results from application of the first database query system and application of the second database query system to form a final query result, the diagnostic determining if a query applied to a deactivated name-node was completed before deactivation occurred, and if not, the alert message indicates that the final query result is unreliable.

8. The system of claim 1 wherein a name-node comprises an application to allocate blocs between the plurality of data-nodes according to a pre-determined arrangement and the alert message indicates that an actual allocation of blocs between the plurality of data-nodes does not correspond to the pre-determined arrangement.

9. The system of claim 1 wherein at least one cluster comprises a layered architecture, the layered architecture characterized as a name-node interacting with at least one data-node by relaying communications from or to the at least one data-node from or to a non-transitory computer readable medium associated with a domain address, the address-associated non-transitory computer readable medium either bears another domain address associated with another non-transitory computer readable medium which communications are relayed from or to, or it bears a bloc, the diagnostic determining if all the domain addresses do or do not span entirely from the name-node to the bloc, the alert message containing data related to an incomplete span.

10. The system of claim 1 further comprising a balancer, wherein the diagnostic further comprises measuring the time taken to complete two concurrent read-write actions within the same cluster, the system generating an alert message indicating a possible failure of the balancer if the time taken for the concurrent actions exceeds a pre-determined threshold.

11. The system of claim 1 in which name-nodes and data nodes all conform to high availability protocols.

12. The system of claim 1 wherein a first subset of the plurality of clusters comprises structured data sets and a second subset of the plurality of clusters comprises unstructured data sets.

13. The system of claim 1 in which a portion of the blocs reside within clusters that are only accessible via communication over an unsecure medium, the diagnostic detecting errors in the creation or retrieval of session keys used for encrypting and de-encrypting communications over the unsecure medium.

14. The system of claim 1 further comprising a data stream service, the data stream service comprising bundling sources which are operational hardware or software configured to receive data items from blocs having similar properties or destinations, unbundling sinks which are operational hardware or software configured to receive data items from bundling sources and to appropriately direct the received data items to a user requesting the received data items, and channels which transfer data downstream from bundling sources to unbundling sinks, the diagnostic determining if the status or operation of one or more of a bundling source, an unbundling sink, or a channel deviates from a pre-determined threshold.

15. The system of claim 14 wherein the channels comprise a plurality of hop paths and branch paths, each hop path defining only a portion of a total path that data traveling from a bundling source to an unbundling sink must traverse, each branch path defining a junction where data traversing a channel may be directed to one of two or more further downstream hop paths, wherein the diagnostic evaluates how many possible paths are operational between a bundling source and an unbundling sink.

16. The system of claim 15 wherein the total number of channels is between 100-300 channels and an alert message is issued if a number of channels drops below 150 channels.

17. A method of executing a computing application within a distributed data environment, the method comprising:
proviiding a system comprising a plurality of clusters, a plurality of clients, and a master node;
the master node is a non-transitory computer readable medium configured to perform diagnostics of the system, the diagnostics comprising:
monitoring and measuring communications between clients and clusters, and
aggregating and analyzing at least a portion of that which is monitored by at least one name-node;
the system is configured to generate an alert message when a diagnostic reveals a measured value exceeding a pre-determined threshold value;
each cluster comprises a dataset, a name-node, a standby name-node, and a plurality of data-nodes;
each dataset is information distributed among a plurality of blocs, each bloc comprising memory residing on at least one data-node;
each data-node is a non-transitory computer readable medium;
each name-node is associated with a unique identifier and comprises a processor configured to:
receive and reply to requests for reading access and writing access to a dataset,
monitor its own operability and the operability of each data-node,
monitor used capacity and overall capacity of the plurality of blocs, and
instruct a data-node to create, delete, or replicate blocs in response to a ratio between the used capacity and the overall capacity;
each client is a non-transitory computer readable medium configured to communicate with a name-node and make requests for reading access and optionally writing access to a dataset;
each standby name-node is configured, when in an active state, to operate substantially identically to a name-node;
the master node is further configured, in response to receiving the alert message and validating the alert message, to place a name-node into de-active state and place a standby name-node into active state.

18. The method of claim 17 further comprising operating services on the system for batch data processing, database query/standard query language ("SQL"), data streaming into or out of the environment, data searching, software development kits ("SDKs"), resource management, environment security, environment file systems, relational operability, structured system integrations, and unstructured system integrations, the diagnostic determining if all of the services are operating according to pre-defined parameters.

19. The method of claim 17 wherein the diagnostic evaluates the health of daemons operating with the system by comparing meta-data values contained in two or more archives that all operating daemons write to chronicling their operations, the alert message indicating a presence of a conflict between the two or more archives.

20. The method of claim 17 further comprising:
receiving a first data processing request from a first client, the first data processing request associated with a first targeted data set distributed among more than one cluster and a second data processing request from a second client, the second data processing request associated with a second targeted data set distributed among more than one cluster;
executing data processing operations associated with the first data processing request by executing software within data-nodes or name-nodes of every cluster the first targeted data set resides within;
executing data processing operations associated with the second data processing request by executing software within data-nodes or name-nodes of every cluster within which the second targeted data set resides;
replying to the first client with a result of the first data processing request; and
replying to the second client with a result of the second data processing request.

\* \* \* \* \*